United States Patent [19]

Bishop et al.

[11] Patent Number: 4,537,667
[45] Date of Patent: Aug. 27, 1985

[54] RADIATION-CURABLE COPOLYMERS OF MONOETHYLENIC MONOMERS

[75] Inventors: Timothy E. Bishop, Arlington Heights; George Pasternack, Lincolnshire; John M. Zimmerman, Mount Prospect, all of Ill.

[73] Assignee: DeSoto, Inc., Des Plaines, Ill.

[21] Appl. No.: 603,836

[22] Filed: Apr. 25, 1984

[51] Int. Cl.$^3$ .............................................. C08F 8/00
[52] U.S. Cl. ......................... 204/159.15; 204/159.16; 204/159.22; 525/59; 525/284; 525/286; 525/293; 525/296; 525/301; 526/286; 526/288; 526/289
[58] Field of Search ................. 525/59, 284, 285, 293, 525/296, 301; 204/159.15, 159.16, 159.22; 526/286, 288, 289

[56] References Cited

U.S. PATENT DOCUMENTS

| | | | |
|---|---|---|---|
| 3,047,544 | 7/1962 | Byrd | 528/390 |
| 3,776,889 | 12/1973 | Pande et al. | 525/59 |
| 3,838,140 | 9/1974 | Mayer-Muder | 528/390 |
| 4,130,518 | 12/1978 | Rybny et al. | 525/59 |
| 4,156,764 | 5/1979 | White | 526/222 |

*Primary Examiner*—Bernard Lipman
*Attorney, Agent, or Firm*—Dressler, Goldsmith, Shore, Sutker & Milnamow, Ltd.

[57] ABSTRACT

Radiation-curable linear addition polymers or copolymers are disclosed having a weight average molecular weight of from about 1,500 to about 15,000 of polymerized monoethylenically unsaturated monomers, which may include up to 25% by weight of an hydroxy-functional monomer, and which carries an hydroxyl group at most of its ends, reacted with a monoethylenically unsaturated monomer carrying a single functional group reactive with the hydroxyl group, so that the polymer carries monoethylenically unsaturated groups bonded to an average of from 1.6 to 5 of the hydroxyl groups per polymer molecule. The preferred radiation-curable polymers are liquid to slowly flowable at room temperature in the absence of organic solvent, and the monoethylenically unsaturated groups are preferably acrylate groups to enable an ultraviolet cure. The terminal hydroxyl groups and the unusually low molecular weight are provided using a bis hydroxyorganic xanthogen disulfide as a chain terminating catalyst when the polymers are formed, and a small proportion of additional hydroxy functionality can be incorporated into the polymers using a hydroxyl functional monomer.

13 Claims, No Drawings

RADIATION-CURABLE COPOLYMERS OF MONOETHYLENIC MONOMERS

DESCRIPTION

1. Technical Field

This invention relates to radiation-curable polymers and copolymers of monoethylenically unsaturated monomers. Liquid coating compositions which are free, or essentially free of volatile organic solvents and which cure on ultraviolet exposure are particularly contemplated.

2. Background Art

Radiation-curable liquid coating compositions are well known, and it is important these be essentially free of inert volatile organic solvent so that one need not remove the solvent prior to radiation cure. As a result of the need to eliminate inert solvents, and also because it is desirable to minimize the proportion of very low molecular weight liquids of low viscosity which provide a solvent function even though they are reactive, it has not been possible to include any significant proportion of proportion of polymers of polymerized monoethylenically unsaturated monomers. This is because such polymers are solid polymers of relatively high molecular weight which do not dissolve easily, even when these polymers are prepared by polymerization in organic solvent solution. It is especially true when the monomer balance is such as to provide a polymer with a glass transition temperature above about $-10°$ C., and the higher the glass transition temperature, the harder and tougher the polymer, so the less likely it is to be of liquid character.

It is desired to provide very low molecular weight polymers and copolymers of polymerized monoethylenically unsaturated monomers, these polymers carrying monoethylenically unsaturated groups, so that they can be incorporated into liquid radiation-curable coating compositions which need very little solvent to enable coating. Indeed, it is preferred that no solvent be present.

As a matter of ease of presentation, the term "polymer" is sometimes used herein where both polymers and copolymers are intended, and the term "solvent is sometimes used where inert volatile organic solvent is intended.

DISCLOSURE OF INVENTION

In accordance with this invention, a linear addition polymer or copolymer having a weight average molecular weight from about 1,500 to about 15,000 of polymerized monoethylenically unsaturated monomers which may include up to 25% by weight of an hydroxy-functional monomer, and which carries an hydroxyl group at most of its ends, is reacted with a monoethylenically unsaturated monomer carrying a single functional group reactive with the hydroxyl group, so that the polymer carries monoethylenically unsaturated groups bonded to an average of from 1.6 to 5 of the hydroxyl groups per polymer molecule. This provides a very low molecular weight linear addition polymer or copolymer carrying a small plurality of monoethylenic groups which is uniquely adapted to be included in liquid radiation-curable coating compositions in the substantial absence of inert organic solvent. The preferred monoethylenic group is the acrylate group, and reliance on acrylate unsaturation enables the provision of liquid coating compositions which are adapted to cure on ultraviolet exposure.

The preferred polymers are liquid to slowly flowable at room temperature in the absence of solvent.

The reaction of the hydroxy groups in the polymer is preferably with a monoethylenic carboxylic acid to provide an ester linkage, or with a monoethylenic hydroxy compound to provide an ether linkage, or with a monoethylenic monoisocyanate to provide a urethane linkage. All of these reactions are well known by themselves.

The hydroxy-terminated polymer structure which is employed herein is described in the commonly owned copending application of J. Zimmerman, J. Krajewski and G. Noren, and is produced by polymerization in inert organic solvent solution containing a bis hydroxy-organic xanthogen disulfide chain-terminating agent in which the organic group is preferably an alkylene group, as in bis(4-hydroxybutylxanthogen)disulfide. This provides a linear polymer most of the polymer molecules of which are terminated by an hydroxyl group at each of its opposite ends and having a molecular weight largely controlled by the proportion of the chain-terminating agent. Polymers and copolymers formed with these chain terminators are much lower in molecular weight than those produced using conventional chain terminators, and those which are liquid, or at least slowly flowable, at room temperature in the absence of solvent are especially contemplated, for these enable the provision of radiation-curable polymer derivatives which can be diluted to coating viscosity with relatively little extraneous liquid. This reduces the proportion of reactive liquid needed to provide coating viscosity and enables the elimination of inert organic solvents. It should here be observed that the proportion of reactive liquid which can be added without disturbing desired properties is limited, and when the amount of reactive liquid needed to provide coating viscosity is too great, then solvent must be added for this purpose.

The monomers which are copolymerized may be free of hydroxy functionality, to increase cure speed or cross-link density and this is preferred when it is desired to maximize film flexibility. However, and to increase cure speed or cross-link density, it is preferred to include from 1% to 10% of an hydroxy monomer based on the weight of total monomers. Suitable hydroxy monomers are hydroxyalkyl acrylates or methacrylates in which there are 2-4 carbon atoms in the alkyl group, such as 2-hydroxyethyl acrylate or methacrylate, 2-hydroxypropyl acrylate, or 2-hydroxybutyl acrylate. Allyl alcohol is also useful. The properties conferred by the hydroxy polymer can vary considerably depending on cross-link density controlled by the number of acrylate groups per molecule, and also upon the selection of the chemical constitution and molecular weight of the polymer.

As previously noted, the hydroxyl-terminated polymers and copolymers which are used herein are preferably liquid or slowly flowable at room temperature in the absence of organic solvent. Linear polymers having a weight average molecular weight of from about 1,500 to 15,000 are contemplated for use in this invention, but it is preferred to have a molecular weight in the range of 2,000 to 12,000, more preferably from 3,000 to 10,000. The physical character of any particular molecular weight polymer will vary with the glass transition temperature of the polymer (calculated from the monomer content in known fashion), so molecular weight is only one factor to be considered. These low molecular weights are obtained at high yield of monomer to polymer, usually 90% or better. As a matter of interest, if the solvent is removed at the end of the polymerization reaction, unreacted monomer is normally removed with the solvent, so the unreacted monomer content of the polymeric product is usually below 1%.

To more fully describe the method of producing the hydroxy-terminated polymers and copolymers which are used herein, these are produced by polymerizing monoethylenically unsaturated monomers in organic solvent solution medium containing a conventional free radical initiator, such as a peroxide, like benzoyl peroxide, or a diazo compound like azo bis isobutyronitrile, and a proportion of a chain-terminating agent which is a bis hydroxyorganic xanthogen disulfide in which the hydroxy group is the sole reactive group carried by the organic group. The preferred organic group is the alkylene group containing from 2–18 carbon atoms, preferably from 3–6 carbon atoms, such as ethylene, propylene, or butylene groups. The proportion of the disulfide chain terminator is determined by the molecular weight which is desired, as will be explained.

It should be stressed that the polymers and copolymers which are provided in the manner described are of unusually low molecular weight, and are frequently liquid, and the ethylenically unsaturated derivatives of this invention are accordingly very easy to dissolve in organic liquids. The increased liquidity enabled by employing the unsaturated derivatives which have been described is thus important in allowing addition copolymers of monoethylenically unsaturated monomers to be effectively used in radiation-curable coating compositions where inert volatile solvents are preferably absent.

The chain terminating agents which are used to provide the controlled molecular weight and hydroxy terminal groups at most of the ends of the polymer molecule preferably have the following structure:

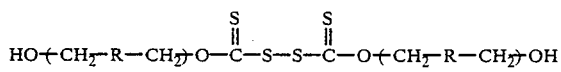

where R is an organic radical free of reactive groups (preferably a hydrocarbon group and most preferably an alkylene group) containing from 0 to 16 carbon atoms, preferably 2 carbon atoms to provide a butylene group, and the OH group is preferably a primary OH group. Suitable groups are the ethylene group, the butylene group, the hexylene group, the dimethyl benzyl group, the dibutyl ether group, and the like. Any organic compound free of reactive groups other than the two alcoholic hydroxy groups or the anhydride of these two hydroxy groups can be incorporated into the xanthogen compound in the same known way as butylene glycol provides the compound which is used as illustrative herein.

The polymers which are formed using the above-described chain terminating agents have the following structure after reaction with the monoethylenically unsaturated monomer having a single group reactive with the hydroxy group:

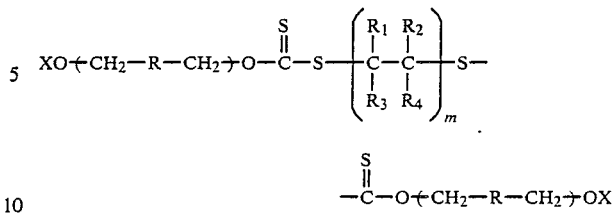

where R is the same as indicated previously, $R_1$, $R_2$, $R_3$ and $R_4$ are the remaining groups in the monoethylenic monomers which were polymerized, or hydrogen, n is the number of repeating units in the polymer providing a molecular weight of from about 1,500 up to 15,000, and X is the residue of a monoethylenically unsaturated monomer having a single hydroxy-reactive functional group. Polymers which are liquid to slowly flowable at room temperature (25° C.) in the absence of solvent are especially preferred.

It will be understood that the conventional initiator will initiate some polymer growth as well as function to convert the chain terminators used herein into free radicals which are effective to both initiate and terminate polymer growth, though most of the termination is by chain transfer with the disulfide. As a result, and while most of the polymer molecules will be hydroxy terminated at both ends, some of these molecules will be hydroxy terminated at only one end, and some molecules may terminate conventionally and not have hydroxy terminal groups. To minimize the presence of polymer molecules with no hydroxy group or with only one hydroxy group, and which hence cannot be reacted with a reactive unsaturated monomer, as illustrated, it is permissible to include a small proportion of hydroxy monomer in the monomers which are copolymerized, as previously pointed out. In this way, the polymer will carry an average of from about 1.6 to 5 reacted hydroxyl groups per molecule.

A large number of monoethylenic monomers may be used alone or in any desired combination, though it is preferred that at least 30%, preferably at least 50% of the copolymer is an acrylate or methacrylate ester with an alkanol containing from 1–18 carbon atoms.

The radiation-curable liquid coating compositions of this invention derive their properties as a result of the incorporation of at least about 25% by weight of the linear polymer or copolymer described herein, preferably at least 40% thereof, based on the weight of the liquid portion of the composition. This requires a linear polymer which is of uniformly low molecular weight as is provided when one starts with the hydroxy-terminated polymers which are employed herein.

Typical monomers which can be used to form the polymers or copolymers of this invention are styrene, vinyl toluene, vinyl acetate, acrylamide, esters of monoethylenic acids, like methyl, ethyl, propyl, butyl acrylate, 2-ethylhexyl acrylate, or the corresponding methacrylates, acrylonitrile, vinyl butyl ether, ethylene, and the like.

It is of interest to observe that one can obtain liquid addition polymers conventionally by using a very large proportion of a low glass transition temperature monomer, such as 2-ethylhexyl acrylate, but these cure to form tacky films which are not desired, except in pressure-sensitive coatings.

It is permissible to include herein monomers which confer an improved capacity to respond to ultraviolet exposure, such as amide monomers, like acrylamide, or amine monomers, like dimethyl aminomethyl methacrylate.

When application of the coating compositions of this invention on optical glass fiber is contemplated, halogen-containing monomers are particularly desired, these being illustrated herein by vinyl chloride, vinylidene chloride and vinylidene bromide. Vinylidene chloride is particularly easy to use, and since it provides polymers which have a high refractive index, it is preferred for the coating of optical glass fibers. Copolymers of these with acrylate esters, like methyl acrylate or isobutyl methacrylate, are particularly contemplated, as will be illustrated hereinafter.

The hydroxyl group of the chain terminating agent is preferably a primary hydroxyl group to minimize its reactivity with acrylate or methacrylate unsaturation. Of course, when such unsaturation is not present, the primary nature of the hydroxyl group is no longer important.

The proportion of the chain terminating agent which may be used herein may vary widely, but the desired low molecular weight is obtained using an amount of up to about 20%, preferably from 2.0% to 15%, based on the weight of the monomers being polymerized or copolymerized. Proportions are important because the proportion of the chain terminator determines the molecular weight which is produced. The more chain terminator, the lower the molecular weight. One molecule of chain terminator for every 15,000 units of monomer molecular weight will yield a weight average molecular weight of about 15,000 plus the weight of the chain terminator (which is comparatively small). The proportion of chain terminator is thus more fully defined by the molecular weight which is desired, and that is more fully defined by the physical character of the polymeric product at room temperature after solvent has been removed.

Having described the hydroxy polymers which are relied upon herein, let us consider the conversion of these polymers to form radiation-curable derivatives.

The monoethylenically unsaturated monomers carrying a single reactive group which is reactive with the hydroxy group carried by the hydroxy-terminated polymer or copolymer is usually an acrylate-functional monoethylenic monomer, such as acrylic acid, or 2-hydroxyalkyl acrylate, or the reaction product of 2-hydroxyalkyl acrylate with a molar proportion of an organic diisocyanate which provides a urethane monoisocyanate. The alkyl group referred to would normally contain from 2-4 carbon atoms and is illustrated by ethyl, propyl and butyl groups. Suitable organic diisocyanates are 2,4-toluene diisocyanate and isophorone diisocyanate, but this class of compounds is well known, and all are useful herein. Acrylic acid can be combined with the hydroxy functionality in the polymer or copolymer by esterification. The hydroxy acrylate can be combined with the hydroxy functionality in the polymer or copolymer by etherification. The isocyanate-functional urethane can be combined with the hydroxy functionality in the polymer or copolymer by urethane formation. All of these reactions are well known and can be carried out in conventional fashion. One will usually consume all of the hydroxy groups in the polymer to replace these with unsaturated groups, but it is permissible, especially when the polymer contains more than two hydroxyl groups per molecule, to leave some of the hydroxyl groups unreacted since this can be beneficial in pigmented systems. Using acrylic acid as an example, some of this acid may be left unreacted since it functions as a reactive diluent which is sometimes used to reduce viscosity. As a result, one can provide excess unreacted hydroxyl groups in the polymer by using a deficiency of monomer reactive therewith, or by leaving some of the reactive monomer unreacted.

Where acrylate functionality is referred to above, the diacrylate polymer or copolymer which is formed may participate in a radiation cure of any desired character, including the preferred ultraviolet radiation. Using the corresponding methacrylate, such as methacrylic acid, 2-hydroxyethyl methacrylate, or a monoisocyanate made by reacting 2-hydroxyethyl methacrylate with a molar proportion of isophorone diisocyanate, one obtains a dimethacrylate polymer or copolymer, and these cure nicely when exposed to electron beam or other penetrating radiation. The methacrylate-functional materials do not cure well on ultraviolet exposure. The corresponding crotonates are also useful when penetrating radiation is used for cure.

The coating compositions of this invention are liquid compositions, the desired liquidity being obtained through the use of at least 10% by weight of reactive diluents which may be monomeric or polymeric, as desired. The monomeric diluents are presently preferred, particularly monoethylenic monomers such as isobornyl acrylate, N,N-dimethyl acrylamide, phenoxyethyl acrylate and ethoxyethoxyethyl acrylate. The corresponding methacrylates are also useful when more penetrating radiation, such as electron beam radiation, is employed for cure.

Polyacrylates which are liquid and which may be used herein in an amount of at leasst 10% by weight, are trimethylol propane triacrylate, butylene glycol diacrylate, glyceryl diacrylate and pentaerythritol triacrylate.

When ultraviolet cure is intended, the coating composition will include a small proportion of photoinitiator and/or photosensitizer, as is well known for this purpose. The common photoinitiators are ketonic, such as benzophenone and acetophenone. The commercial photoinitiator, benzildimethyl ketal will be used hereinafter in an example. Tertiary amines, such as triethyl amine, may also be added to speed the cure, but are not usually needed.

EXAMPLE 1 (synthesis of bis(4-hydroxybutylxanthogen)disulfide)

1338.2 grams of 1,4-butanediol (14.849 moles) and 143.0 grams of carbon disulfide (1.1878 moles) were poured into a 5 liter 4-necked round bottom flask fitted with a stirrer, a dropping funnel, and a thermometer. The flask was immersed in ice water to cool its contents to 17° C. and 260 ml. of an aqueous solution containing 75.7 grams of sodium hydroxide (1.893 moles) were added through the dropping funnel over a period of 1 hour. The mixture in the flask was stirred at room temperature for 3 hours. 400 ml. of water were then added and then 550 ml. of an aqueous solution containing 242.7i grams of ammonium persulfate were added dropwise over a 1 hour period. The product was then diluted with 800 ml. of water and then extracted with 1500 ml. of methylene chloride. This dilution with water followed by extraction with methylene chloride was carried out twice and the product was then contacted with magnesium sulfate to remove any water present. The methylene chloride was then removed by vaporizing it at 30° C. under vacuum. 312.6 grams of liquid product having a yellow color and a slight sulfur odor were obtained. This represents a yield of 100.7% of the theoretical yield.

EXAMPLE 2 (Production of low molecular weight polymer)

A 2 liter 4-necked flask was set up with a stirrer, a thermocouple probe, a cold water condenser, and a nitrogen blanket and placed in a water bath maintained at 60° C. 11.4 grams of the commercial free radical generating catalyst (Vazo 52) were added to the flask in 402.4 grams of methyl ethyl ketone. After 5 minutes to warm the flask contents, a separately prepared liquid mixture of 647.7 grams of a mixture of vinylidene chloride and methyl acrylate in a mole ratio of 1.7:1 to which was added 24.8 grams of the bis(4-hydroxybutylxanthogen)disulfide of Example 1 was slowly added to the flask over a 3 hours period. The temperature in the flask increased as the monomer reacted, and when the temperature finally subsided back to the temperature which existed before monomer addition, it was concluded that polymerization was complete. The solvent was then removed at 60° C. using a vacuum which reached 30 mm Hg.

The product had an equivalent weight (based on hydroxy) of 4600.

EXAMPLE 3

One molar proportion (two hydroxyl equivalents) of the hydroxy-terminated polymer of Example 2 is reacted with 2 moles of isophorone diisocyanate and 1 mole of 2-hydroxyethyl acrylate. The reaction is carried out in the presence of 31% isobornyl acrylate and 4% N,N-dimethyl acrylamide as diluents which are reactive in the subsequently desired radiation cure. This product was then used in a coating formulation as follows:

EXAMPLE 4

87 parts of the product of Example 3 are combined with 10 parts of acrylic acid which reduces the viscosity to that appropriate for coating application, and 3 parts of benzildimethyl ketal (Ciba Geigy product Irgacure 651 may be used). The coating composition so-provided has a viscosity of 9560 centipoises and is a clear liquid. After application onto a glass substrate and cure with ultraviolet light, the product was found to form a clear non-tacky film which adhered strongly to the glass and which had a high tensile strength, an elongation less than 5% and a rupture strength of less than 500 inch pounds per cubic inch. Strong adhesion to rigid surfaces is unusual in radiation-cured coatings, so the product of this example is a candidate for the coating of rigid metal and ceramic objects.

EXAMPLE 5

Example 2 is repeated replacing the 100 grams of monomers used therein with 100 grams of a liquid mixture of 18.6 grams of vinylidene chloride, 75 grams of 2-ethylhexyl acrylate and 6.4 grams of 2-hydroxyethyl acrylate to which is added 9.21 grams of the same xanthogen disulfide chain-terminating catalyst. The 11.4 grams of Vazo 52 catalyst was replaced by 1.95 grams. The polymer product of this example had a viscosity of 7940 centipoises after removal of solvent. Using this liquid polymer in a repeat of Example 3, and then curing with ultraviolet light in the presence of 3% of Irgacure 651 provided a continuous non-tacky film having a tensile strength of 679 psi., an elongation of 57%, and a room temperature modulus of 2807 psi.

EXAMPLE 6

Example 5 was repeated using 100 grams of a monomer mixture containing 77.6 grams of methyl acrylate, 19.4 grams of styrene, 3.0 grams of 2-ethylhexyl acrylate and 4.25 grams of the same xanthogen disulfide chain-terminating catalyst. 1.74 grams of Vazo 52 was used in the ketone solution. The product had an equivalent weight of 2,070 and an hydroxy functionality of about 4. The weight average molecular weight by calculation is 8,280, but is probably slightly higher than this. This resin was reacted in the same way as in Example 3 except the reaction is carried out in the presence of 52.6% of isobornyl acrylate. 82 grams of the solution product is then combined with 15 grams of phenoxyethyl acrylate and 3 grams of Irgacure 651 to provide a liquid coating composition having a viscosity of 7080 centipoises. On ultraviolet curing, a film of this composition was found to have a tensile strength of 1992 psi., an elongation of 76%, a room temperature modulus of 74,880 psi., and a rupture strength of 2288 inch pounds per cubic inch.

What is claimed is:

1. A radiation-curable linear addition polymer or copolymer having a weight average molecular weight of from about 1,500 to about 15,000 of polymerized monoethylenically unsaturated monomers, which may include up to 25% by weight of an hydroxy-functional monomer, and which carries an hydroxyl group at most of its ends, reacted with a monoethylenically unsaturated monomer carrying a single functional group reactive with the hydroxyl group, so that the polymer carries monoethylenically unsaturated groups bonded to an average of from 1.6 to 5 of the hydroxyl groups per polymer molecule, said polymer having the structure:

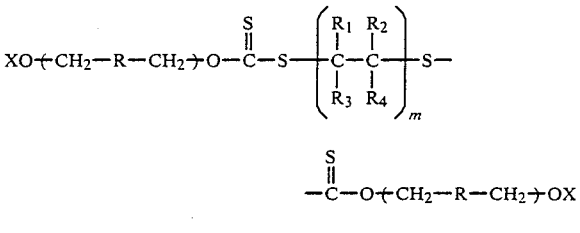

where R is an organic radical free of reactive groups, R1, R2, R3 and R4 are the remaining groups in the monoethylenic monomers which were polymerized, or hydrogen, n is the number of repeating units in the polymer providing the said molecular weight, and X is the residue of a monoethylenically unsaturated monomer having a single hydroxy-reactive functional group.

2. A polymer as recited in claim 1 which is liquid to slowly flowable at room temperature in the absence of solvent.

3. A polymer as recited in claim 1 in which said monoethylenically unsaturated groups are acrylate groups.

4. A polymer as recited in claim 1 in which said polymerized monoethylenically unsaturated monomers include from 1% to 10% by weight of total monomers of an hydroxyl-functional monomer.

5. A polymer as recited in claim 1 in which said polymerized monoethylenically unsaturated monomers do not include hydroxyl-functional monomer.

6. A polymer as recited in claim 1 in which said monoethylenically unsaturated groups are linked to said polymer by a linkage selected from ester, ether and urethane linkages.

7. A polymer as recited in claim 1 in which said polymer has the structure:

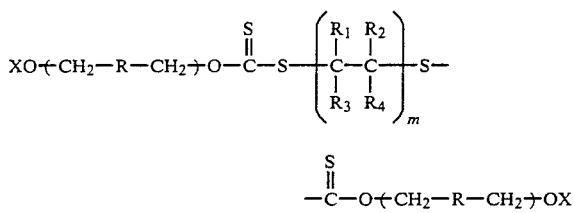

where R is an organic radical free of reactive groups, $R_1$, $R_2$, $R_3$ and $R_4$ are the remaining groups in the monoethylenic monomers which were polymerized, or hydrogen, n is the number of repeating units in the polymer providing a molecular weight of from about 2,000 up to 12,000, and X is the residue of a monoethylenically unsaturated monomer having a single hydroxy-reactive functional group.

8. A polymer as recited in claim 1 in which said hydroxy-reactive functional group is selected from hydroxy, carboxy and isocyanate groups.

9. A liquid coating composition comprising at least 25% by weight of the polymer of claim 1 in admixture with liquid components selected from monoethylenically unsaturated liquids and polyethylenically unsaturated liquids.

10. A liquid coating composition as recited in claim 9 in which said monoethylenically unsaturated liquid is selected from isobornyl acrylate, N,N-dimethyl acrylamide, phenoxyethyl acrylate and ethoxyethoxyethyl acrylate.

11. A liquid coating composition as recited in claim 9 in which a liquid polyacrylate is present.

12. A liquid coating composition as recited in claim 11 in which said liquid polyacrylate is selected from trimethylol propane triacrylate, butylene glycol diacrylate, glyceryl diacrylate and pentaerythritol triacrylate.

13. A liquid coating composition as recited in claim 9 in which said composition includes a photoinitiator and/or a photosensitizer rendering the composition sensitive to ultraviolet light.

* * * * *

UNITED STATES PATENT AND TRADEMARK OFFICE
CERTIFICATE OF CORRECTION

PATENT NO. : 4,537,667

DATED : August 27, 1985

INVENTOR(S) : Timothy E. Bishop et al.

It is certified that error appears in the above-identified patent and that said Letters Patent is hereby corrected as shown below:

In the formula at Column 4, line 8, and in claims 1 and 7, the lower case "m" should be a lower case "n".

Signed and Sealed this

Nineteenth Day of November 1985

[SEAL]

Attest:

DONALD J. QUIGG

Attesting Officer

Commissioner of Patents and Trademarks